United States Patent Office 3,109,750
Patented Nov. 5, 1963

3,109,750
PROCESS FOR COATING POROUS MATERIAL WITH A MICROPOROUS ELASTOMERIC POLYMER DISSOLVED IN A VOLATILE MIXTURE OF A KETONE AND A VOLATILE ALIPHATIC HYDROCARBON
Irvan Druid Roche, Akron, Ohio, assignor to E. I. du Pont de Nemours and Company, Wilmington, Del., a corporation of Delaware
No Drawing. Filed Mar. 3, 1959, Ser. No. 796,746
5 Claims. (Cl. 117—98)

This invention is directed to novel coatings containing elastomers as the principal film-forming material and to coating compositions for producing them. More particularly, these coatings are microporous and permeable to gases and vapors and may be applied to discontinuous surfaces such as cut sponge and fabrics to form continuous porous coatings bridging the interstices.

The present invention significantly solves two distinct and important problems encountered in the field of elastomer coating compositions; these problems are (1) the coating of coarsely porous materials and (2) the provision of elastomer coatings permeable to water vapor.

When a conventional coating composition is applied to porous materials, much of it, while still liquid, soaks into the porous material and does not contribute to the actual formation of a film on the surface. Fairly satisfactory methods for overcoming this wasteful situation have long been used in specific cases such as in the case of wood which is first treated with a cheap and high pigmented undercoat when an enamel is to be applied; or, this wood may be "filled" with a highly pigmented paste to prevent the soaking in of a subsequently applied clear varnish or lacquer. In the case of house paints, the first coat is used as a primer and undercoat. The difficulties, however, are much increased when the material to be coated is coarsely porous and the coating must be elastic. There is the additional difficulty of "bridging" over relatively large openings such as exist in the cut surface of a sponge material or between the fibers of a fabric. Fabrics may of course be skim-coated on calender rolls with a thin, non-penetrating layer of an elastomer but this solution of the problem has limitations as to the thickness of the coat and can be applied only to cloth in long lengths in addition to requiring expensive equipment. There is no known practical way, prior to the present invention, of applying such coatings to cloth and other porous materials when made up into partly finished articles.

Again, the problem of making finely porous, permeable elastomer coatings, such as are of potential importance as components of artificial leathers which must be permeable to water vapor, that is, "breathable," has not yet been fully solved; the only ways now available for making them involve the use of a blowing agent or mechanically puncturing an impermeable elastomer layer with fine needles.

It is an object of the present invention to provide novel coating compositions for coating coarsely porous materials, said coating being permeable to water vapor. It is another object of this invention to provide novel elastomer coatings permeable to water vapor which coatings may be applied to give various thicknesses as desired. It is still a further object of this invention to enable the coating of cut surfaces of sponge and other porous discontinuous materials.

These and other objects will become apparent in the following description and claims.

More specifically, the present invention is directed to a liquid coating composition for forming a continuous but sponge-like and porous film, which is permeable, said composition comprising an elastomeric polymer dissolved in a volatile mixture of acetone or methyl ethyl ketone and an aliphatic hydrocarbon which has a vapor pressure difference from acetone.

The elastomer utilized according to this invention may, for example, be polychloroprene, a butadiene polymer or a copolymer of butadiene, such as butadiene-styrene and butadiene-acrylonitrile, or a chlorosulfonated polyethylene which is preferred because of its toughness, even in the uncured state; a copolymer of vinylidene fluoride and hexafluoropropene may be utilized. n-Hexane with a vapor pressure one-third to one-fourth less than that of acetone is preferred; however, still less volatile aliphatic hydrocarbons on the one hand and more volatile hydrocarbons such as n-pentane on the other may be used to advantage in the solvent mixture. It will be noted that both the ketones and the aliphatic hydrocarbons are, by themselves, nonsolvents for the elastomers in almost all cases. Mixtures of the two containing from about 20 to about 65 of the ketone dissolve the elastomers and are the critical feature of this invention, since they appear to be responsible for the sponge permeable structure of the coatings and manner in which they cover coarsely porous surfaces. When the same elastomers are applied from conventional solvents, such as toluene, they penetrate into the substrate and form impervious films. Because of the different effects of other solvents, the ketones and aliphatic hydrocarbon should together form at least 85% of the total solvent. The small amounts of the other solvents may be useful in incorporating other ingredients of the coating composition or in modifying the drying rate of the over-all solvent blend. As the ratio of aliphatic hydrocarbon to acetone increases over most of the range, the permeability and the number and fineness of the pores increases.

The conventional curing agents for the particular elastomer used are ordinarily included in the coating compositions and the sprayed films are usually heated to promote curing or else are allowed to cure slowly at ordinary temepratures. The present invention does not depend on the presence of curing or on the specific curing agents used. The conventional antioxidants, stabilizers, coloring, reinforcing, and extending agents are usually also present. The permeability increases as the proportion of pigment increases. The ratio of elastomer to solvent may be varied so as to give a viscosity suitable for spray application, usually between 100 and 400 centipoises. The compositions of the following representative examples are within this range.

The compositions of the present invention may be advantageously applied to woven and unwoven fabrics, paper, felt, wood, concrete, and the like as well as to cut surfaces of sponge and other porous and discontinuous materials. They may serve as the undercoat for coatings of different compositions.

Representative examples illustrating the present invention are as follows:

*Example 1*

A solution of 100 parts by weight of chlorosulfonated polyethylene, containing 29% chlorine and 1.2% sulfur, in 112 parts of acetone and 184 parts of hexane, also containing 8 parts of an epoxy resin (Epon 812) made from epichlorhydrin and 2,2-bis(p-hydroxyphenyl) propane is mixed with a pigment dispersion made by grinding 150 parts of titanium dioxide, 5 of chrome yellow, and 3 of Bentone 34, a bentonite clay modified by treatment with dimethyl dioctadecyl ammonium hydroxide in 86 of acetone, 86 of hexane, 40 of toluene, and 25 of isopropyl alcohol. To this mixture is added, just before use, a solution of 0.20 part of diethylene triamine in 5 parts of methyl ethyl ketone and 5 of isopropyl alcohol. It will be noted that 58% of the acetone-hexane is hexane and that this combination is 86% of the total solvent. The pigment volume concentration is 28%.

This composition is sprayed from a spray gun upon diagonal weave nylon and upon a cut surface of polyurethane foam. Specifically, a Binks Model 18 is used with a syphon cup, air nozzle No. 66 SD and needle No. 65, with the material nozzle 4 to 5 turns open, the fan nozzle one turn open, and, 35 pounds air pressure. This gun is available from the Binks Mfg. Co., Chicago, Ill. Drying is rapid, forming a continuous coating, bridging over the spaces between the fibers of the fabric and formed by the open cells in the cut foam material. The solvent evaporates rapidly. By making several passes of the spray gun, coatings 6 to 15 mils thick may be applied in one operation. Additional coats may be applied at short intervals. Curing may be brought about by heating, for example for 2 hours at 100° C.

Examination of the surface of the coating shows it to contain rather closely spaced fine pores with diameters from 0.5 to 1.5 mils. With strong illumination under a microscope, a cross-section of the film is shown to be cellular and the walls of many of these cells are seen to be pierced with minute holes. The permeability of the coating is measured quantitatively by clamping a piece of fabric coated with the porous film, over the mouth of a cup containing a small amount of water and determining the loss of weight of this assembly when placed in a dry atmosphere in a room at 50% relative humidity and 75° F. Under these conditions water vapor passed through the film at the rate of 75 g. per day per 100 square inches of film per mil of film thickness. This is about 100 times the amount of water vapor which will pass through an identical composition applied from a solvent consisting principally of toluene.

*Example 2*

A similar coating composition is made by making separately the following elastomer, a pigment, and curing agent dispersions, and mixing them before use as in Example 1. The elastomer dispersion consists of 100 parts by weight of the same chlorosulfonated polyethylene, and 8 parts of epoxy resin, dissolved in 108 parts of acetone and 162 parts of hexane. The pigment is 100 parts of titanium dioxide and 3 parts iron oxide dispersed by pebble mill grinding with 3 parts of Bentone 34 in 62 parts of acetone, 93 parts of hexane. The curing solution is 0.2 part of diethylene triamine dissolved in 5 parts of isopropyl alcohol and 5 parts of methylethyl ketone. A coating is obtained by spray application similar to that of Example 1.

*Example 3*

A similar coating composition is made using a soluble polychloroprene elastomer made in aqueous emulsion in the presence of dodecyl mercaptan. This is milled with 4 parts of magnesium oxide (per 100 parts of polychloroprene by weight), 5 of zinc oxide, 2 of 2,2'-methylene bis(4-methyl-6-tertiary butyl) phenol, 100 of titanium dioxide, and 5 of chrome yellow pigment and then dissolved in 389 parts of acetone and 475 of hexane. Before use, 1.0 part of diethylene triamine in 5 parts of methylethyl ketone and 5 of isopropyl alcohol is added. The coating obtained by spraying this on nylon bridges over the spaces between the fibers, and, again like the film of chlorosulfonated polyethylene obtained in Example 1, it is continuous but contains numerous fine pores or cells communicating with each other through minute holes. The permeability to water vapor is about the same as for the product of Example 1.

*Example 4*

Similar results are obtained with a commercial butadiene-styrene copolymer elastomer, made at low temperature and containing 23.5% styrene. This is milled with 50 parts of clay (per 100 parts by weight of the elastomer) 5 of zinc oxide, 5 of precipitated hydrated silica, 2 of a blue anthraquinone pigment, 2 of stearic acid, 2 of sulfur, and 2 of the non-discoloring antioxidant tri(tertiary butyl) p-phenyl phenol (Zalba) and then dissolved in 265 parts of acetone and 669 parts of hexane. The accelerator, 1 part of tetraethyl thiuram disulfide in 10 parts of xylene, is added just before use. Porous coatings like those of the preceding examples are obtained when the composition is sprayed on nylon.

*Example 5*

A heat-resistant copolymer of vinylidene fluoride and hexafluoropropene, "Viton" A (see Industrial and Engineering Chemistry, 49, 1687 (1957)), forms the basis for a similar coating composition, made by dissolving 100 parts of the elastomer in 115 of acetone and 77 of hexane and mixing with 67 of titanium dioxide, 1 part iron oxide red, 3 of Bentone 34, 10 of zinc oxide, and 10 of dibasic lead phosphite, which have been ground in a pebble mill in 115 of acetone and 77 of hexane. Before use, 0.5 part of diethylene triamine in 5 of methylethyl ketone and 5 of isopropyl alcohol is added. Porous coatings like those in the preceding examples are obtained when the composition is sprayed on nylon.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for coating coarsely porous material with a sponge-like and porous film permeable to water vapor, which process comprises spray coating said coarsely porous material with a polymeric elastomer selected from the group consisting of polychloroprene, butadiene-styrene copolymer, chlorosulfonated polyethylene copolymer, butadiene-acrylonitrile copolymer and vinylidene fluoride-hexafluoropropene copolymer, said elastomer being dissolved in a volatile mixture of (1) a ketone selected from the group consisting of acetone and methyl ethyl ketone, and (2) a volatile aliphatic hydrocarbon selected from the group consisting of n-hexane and n-pentane, said volatile aliphatic hydrocarbon having a vapor pressure different from that of said ketone, said mixture containing from about 20 to 65% of said ketone, the solution of said elastomer in said volatile mixture having a viscosity within the range of 100 to 400 centipoises.

2. The process of claim 1 wherein the polymeric elastomer is chlorosulfonated polyethylene, the ketone is acetone and the aliphatic hydrocarbon is n-hexane.

3. The process of claim 1 wherein the polymeric elastomer is chlorosulfonated polyethylene, the ketone is acetone and the aliphatic hydrocarbon is n-pentane.

4. A process for coating coarsely porous material with a sponge-like and porous film permeable to water vapor, which process comprises spray coating said coarsely porous material with a polymeric elastomer selected from the group consisting of polychloroprene, butadiene-styrene copolymer, chlorosulfonated polyethylene copolymer, butadiene-acrylonitrile copolymer and vinylidene fluoride-hexafluoropropene copolymer, said elastomer being dissolved in a volatile mixture of (1) a ketone selected from the group consisting of acetone and methyl ethyl ketone, and (2) n-hexane, said mixture containing from about 20 to 65% of said ketone, the solution of said elastomer in said volatile mixture having a viscosity within the range of 100 to 400 centipoises.

5. The process of claim 4 wherein the polymeric elastomer is chlorosulfonated polyethylene and the ketone is acetone.

References Cited in the file of this patent

UNITED STATES PATENTS

| | | |
|---|---|---|
| 2,593,681 | Leydon | Apr. 22, 1952 |
| 2,615,820 | Schwoegler | Oct. 28, 1952 |
| 2,692,245 | Groves et al. | Oct. 19, 1954 |
| 2,826,509 | Sarbach | Mar. 11, 1958 |
| 2,938,876 | Morris | May 31, 1960 |

FOREIGN PATENTS

| | | |
|---|---|---|
| 790,803 | Great Britain | Feb. 19, 1958 |

OTHER REFERENCES

Scheibli et al.: Official Digest, July 1952, pp. 491–503.

"Hypalon," Du Pont Information Bulletin X–8, March 1951.

"Hypalon," Du Pont Information Bulletin X–34, August 1952.